Jan. 21, 1969 W. D. RICHARDSON 3,422,980

SELF-SEALING TEST PLUG

Filed March 21, 1967

INVENTOR
WILLIAM D. RICHARDSON
BY Mann, Brown, McWilliams
ATT'YS.

United States Patent Office
3,422,980
Patented Jan. 21, 1969

1

3,422,980
SELF-SEALING TEST PLUG
William D. Richardson, Palos Heights, Ill., assignor to Tuthill Pump Company, a corporation of Illinois
Filed Mar. 21, 1967, Ser. No. 624,808
U.S. Cl. 220—25         8 Claims
Int. Cl. B65d 45/00

ABSTRACT OF THE DISCLOSURE

This invention relates to a self sealing test plug, such devices being employed to temporarily seal an open aperture in a container being tested while a medium under pressure is introduced into the container for testing purposes. The test plug is of the self sealing type including a spring biased piston or plunger carrying a seal that engages the outer periphery of the aperture and a cylinder in which the piston operates, which cylinder carries a stem that is to project through the container aperture and in turn carries a locking device for cooperation with the aperture inner periphery for biasing the seal into sealing relation with the aperture under the biasing action of the spring that is interposed between the piston and the cylinder. The locking device of the invention is in the form of a triangular pawl that retracts for insertion through the aperture and is extended by a special spring biased bushing received about the stem that extends through the seal and is biased to a position for turning the pawl to its extended position, when the cylinder is operated to permit the seal biasing spring to set the seal against the aperture.

---

In the manufacture of pressure containers, such as barrels, drums, conduits, hoses, casings, tanks, etc., it is often essential that each individual unit be pressure tested before shipment to the ultimate user in order to insure that the equipment involved is free from leakage and meets adequate safety requirements that will avoid the possibility of leakage or explosion under use. Where large numbers of such pressure containers are to be tested it is essential that the seal provided be applied and removed in the quickest possible manner to keep testing time at a minimum.

Furthermore, in testing equipment of this type, it is necessary to employ testing pressures several times larger than would normally be intended to be experienced to be sure that a sufficient safety factor resides in the equipment to protect its users. Thus, the forces involved tending to blow the test plug from the aperture are considerable.

It is a principal object of my invention to provide a self sealing test plug which may be readily and quickly inserted into the aperture for sealing purposes and which may be readily and quickly removed therefrom.

Another principal object of my invention is to provide a self sealing test plug which utilizes the pressure being applied inside the container being tested to aid in effecting the seal over the aperture so that regardless of the pressure applied, a greater force is exerted against the seal thereby preventing a leakage around the sealing gasket, while the unit is positively locked in the aperture by the pawl and stem assembly.

Still another principal object of this invention is to provide a self sealing type test plug that greatly improves the sealing action provided while providing a unit that is more readily and easily installed than previous similar devices.

Other objects of the invention are to provide a self sealing test plug arrangement that is economical of manufacture, convenient in use, and adaptable for incorporation in a wide variety of types and sizes of test plugs.

Still other objects of the invention are to provide a self sealing test plug arrangement that is economical of manufacture, convenient in use, and adaptable for incorporation in a wide variety of types and sizes of test plugs.

Still other objects, uses and advantages will be obvious or become apparent from a consideration of the following detailed description and the application drawing.

However, it is to be understood that the specific drawing illustrations provided are supplied primarily to comply with the requirements of the Patent Code and that the invention may have other embodiments that will be obvious to those skilled in the art.

Figures 1, 2, 3:
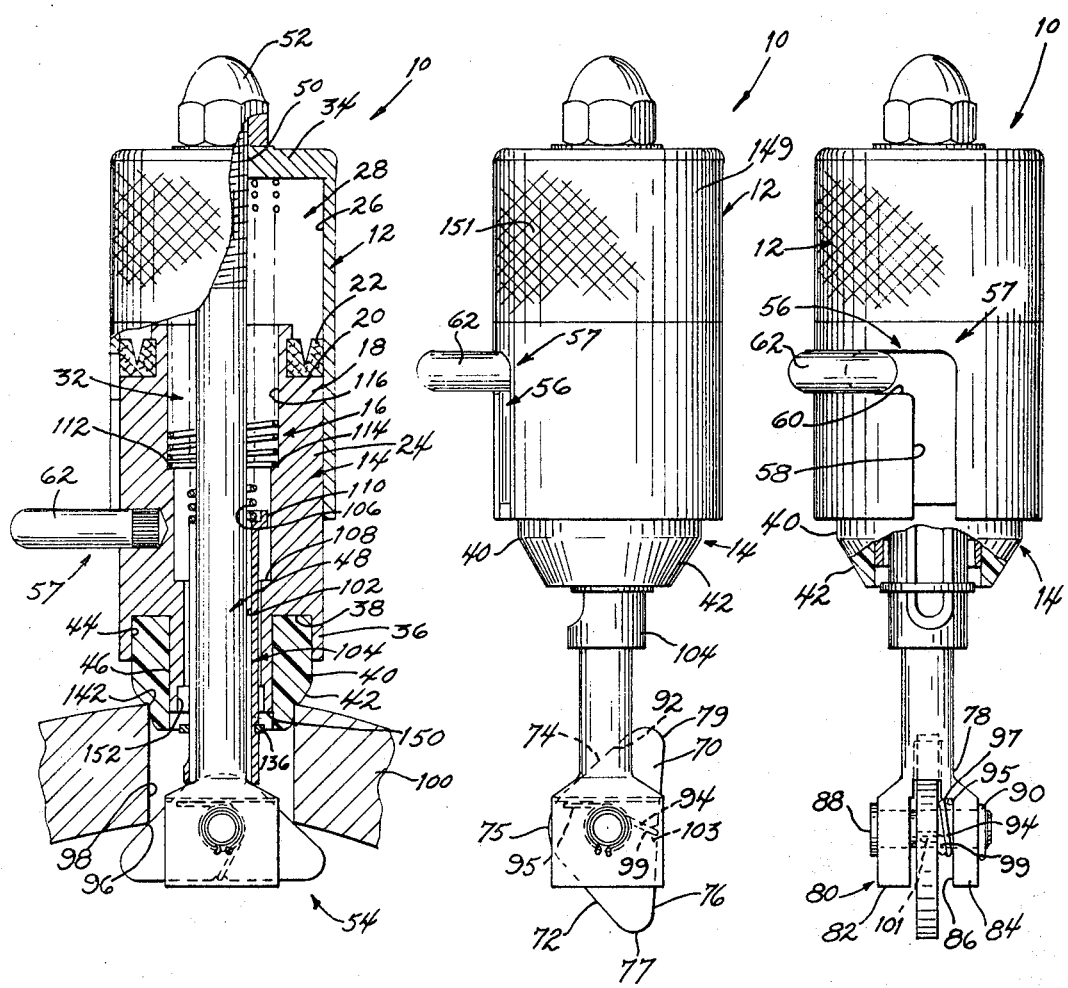
FIGURE 1 is a side elevational view of a preferred embodiment of the invention, showing the test plug arranged to insert the stem and its locking device within the aperture of a pressure container or vessel to close the aperture for testing purposes.
FIGURE 2 is a side elevational view of a device shown in FIGURE 1 from the left hand side thereof, with parts being broken away.
FIGURE 3 is a sectional view through the device along its longitudinal axis, showing same applied to a pressure vessel aperture in sealing relation therewith.

Reference numeral 10 of FIGURES 1–3 generally indicates a preferred embodiment of the invention in which the test plug comprises a cylinder or housing 12 in which is reciprocably mounted a plunger or piston 14 that is biased outwardly of the cylinder 12 by compression spring 16.

Piston or plunger 14 is formed about its inner end 18 (see FIGURE 3) with an undercut groove 20 adapted to receive a sealing ring 22 that is in the nature of a piston ring adapted to prevent the escape fluid under pressure between the outer side wall 24 of the piston and the inner side wall 26 of the cylinder.

The piston 14 and the cylinder 12 cooperates to define an expandable and contractible pressure chamber 28.

The piston 14 is formed with a stepped diameter bore 32 in which the compression spring 16 seats with the other end of the compression spring being applied against the end wall 34 of the cylinder or housing 12. At the bottom or outer end 36 of the piston an annular groove 38 is formed in which is received an annular sealing member 40 formed from neoprene rubber or the like that is formed to define the frustoconical sealing surface 42. Ring 40 is frictionally retained between the walls 44 and 46 that define the groove 38.

The bore 32 extends through the piston or plunger 14 and received in the bore 32 is stem or shaft 48 that is threadedly secured to the end wall 34 of housing or cylinder 12 as at 50 and is locked in place by nut 52.

The other end of the stem 48 carries the special locking device 54 that is arranged in accordance with this invention.

The housing or cylinder 12 is formed with a right angled slot 56 having an arm or segment 58 that extends axially of the cylinder or housing and an arm 60 that extends transversely thereof for cooperation with a pin or handle 62 that is carried by the plunger or piston 14. The pin or handle 62 and the slot 56 form a familiar type of bayonet type lock arrangement 57 for securing the piston member 14 against movement outwardly of the housing or cylinder 12 under the action of compression spring 16.

The stem carried locking device 54 comprises a pawl 70 that is of isosceles triangle configuration including sides 72 and 74 that are of equal lengths and merge into rounded corner 75, and side 76 which in the form shown is of greater length than the side 72 and 74 and merges into the latter sides at rounded corners 77 and 79.

The outwardly extending end 78 of the stem 48 is bifurcated as at 80 to define lug portions 82 and 84 separated by a slot 86. The pawl 70 is disposed in the slot 86 and is pivoted therein by pin 88 held in place by suitable locking ring 90.

As indicated in FIGURES 1–3, the stem slot 86 is proportioned so that pawl 70 can pivot between the two extreme positions shown in FIGURES 1 and 3, respectively, with the slot 86 extending upwardly of stem end 78 to define inclined abutment surface 92 against which the pawl side 74 is biased by torsion spring 94 that is applied between the pawl and the stem 48 in the manner indicated in the drawings, with spring arm 95, being applied against stem surface 97 and spring arm 99 being angled at its end 101 for engagement with notch 103 in pawl side 76.

The pawl 70 is proportioned such that its dimension lengthwise of its side 76 will exceed the diameter or width of the inner periphery 96 of port or opening 98 of a vessel or container 100 to be tested within the size range of the particular device 10 illustrated, while the dimension laterally of said pawl side 76 is such that the pawl and stem end 78 may be readily inserted through the container opening 98. The spring 94 thus biases the pawl to its inoperative retracted position of FIGURE 1 and against the stem abutment surface 92.

The bore 32 of piston or plunger 14, as already noted, is of stepped diameter configuration including a section 102 that slidably receives the special bushing 104 which in accordance with this invention cooperates with the pawl sides 72 and 74 to move the pawl from its retracted position of FIGURE 1 to its extended position of FIGURE 3.

The bushing 104 is biased outwardly of the piston or plunger 14 by a compression spring 106 extending between the cylinder or housing end wall 34 and a spring seat 124 of bushing 104, which in the position of FIGURES 1 and 2 seats on piston shoulder 108 at the end of intermediate section 110 of bore 32. The spring 16 at its inner end 112 seats against piston shoulder 114 that defines the end of enlarged bore section 116.

Figure 4:
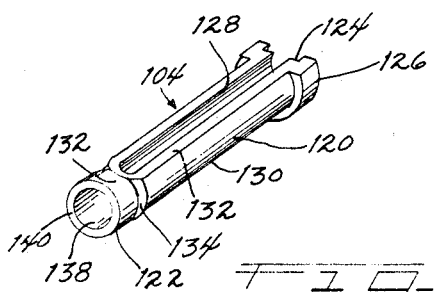
FIGURE 4 is a perspective view of the special bushing that operates the locking pawl of the devices of FIGURES 1–3.

As indicated in FIGURES 3 and 4, the bushing 104 comprises a sleeve 120 having its end 122 proportioned to engage pawl sides 72 and 74 adjacent corner 75 and defining the spring seat 124 at its other end 126 against which spring 106 seats.

Bushing 104 is formed with an elongate slot 128 that extends from its end 126 to a point adjacent its end 122, with the slot 128 being formed by milling its cylindrical side surface 130 flat as indicated at 132 to the depth required to define the slot 128.

This leaves the bushing 104 with a restricted connecting portion 132 at its end 122.

The surface 130 of bushing 104 is formed with recess 134 to receive an annular locking ring 136 for reinforcing purposes and to serve as a stop to limit the permissible movement of bushing 104 inwardly of the piston.

As indicated in FIGURE 3, the bore 138 of bushing 104 has an internal diameter that is sufficiently greater than the external diameter of stem 48 so that the annular inner corner 140 of bushing end 122 contacts the pawl sides 72 and 74 at a point sufficiently great from the midportion of pawl corner 75 to permit the bushing 104 to exert the leverage that is required (under the force provided by the compression spring 16 acting through spring) on the pawl to move it from its position of FIGURE 1 to its position of FIGURE 3 during operation of the device.

When the test plug 10 is to be used, the plunger or piston 14 is pressed into the cylinder housing 12 to dispose locking arm 62 in alignment with the slot section 60 (which contracts chamber 28), after which the locking arm and thus the plunger or piston is rotated to place the arm 62 within the slot segment 60. This positions the stem 104 in its extended position with respect to the plunger 14, in which position the bushing 104 will be held in the relative position shown in FIGURE 1 with respect to pawl 70 by its spring seat end 126 seating against plunger shoulder 108. As thus positioned, the pawl 70 is allowed to assume its retracted position under the action of its torsion spring 94 as indicated in FIGURE 1.

The end 78 of the stem 48 and pawl 70 are then inserted into and through the container opening 98 to rest the seal 40 on the external edge surface or periphery 142 of the opening 98, whereupon the locking arm 62 is moved into alignment with the housing slot segment 58 to permit the main spring 16 to move piston or plunger 14 outwardly of its cylinder 12, thus expanding chamber 28 and in effect drawing the stem 48 inwardly of the piston 14. This draws the side 74 of the pawl 70 into camming relation against the bushing end 122, and the pawl 70 is pivoted from its retracted position of FIGURE 1 to its extended position of FIGURE 3 in which the said bushing edge surface 140 engages both sides 72 and 74 to provide the positive centering action indicated in FIGURE 3. At the same time, the action of spring 16 in withdrawing the stem 48 within chamber 28 compresses spring 106 with the result that the bushing end 126 is lifted off the shoulder 108, although the biasing action on the pawl 70 is maintained in any event to the extent necessary to hold the pawl 70 in the position of FIGURE 3. The action of the main spring 16 in withdrawing stem 48 into the thus expanding chamber 28 tends to draw the pawl 70 towards the seal 40 and thus the seal 40 is drawn into the compressed sealing engagement with outer peripheral edge 142 that is indicated in FIGURE 3.

To release the device 10, one pushes housing or cylinder 12 in the direction of the container 100 to contract the chamber 28 and move the stem 48 outwardly of the piston 14. As this movement continues, the end 26 of bushing 104 seats against piston shoulder 108 and pawl 70 is thus permitted to pivot under the biasing action of its torsion spring 94 from the position of FIGURE 3 to the position of FIGURE 1. When pin 62 is aligned with housing slot portion 60, the housing 12 is then rotated with respect to the arm 62 to dispose the locking arm 62 in its slot segment 60, after which the test plug may be readily withdrawn from the opening 98 by merely moving it straight outwardly. The outer surface 149 of cylinder 12 is knurled as at 151 to facilitate handling.

As indicated in FIGURE 3, in the locked position of the device 10 the slot 128 of bushing 104 is disposed to extend between the outermost end 150 of the piston and its bore segment 110 thus providing for the free flow of fluid from within the container 100 into chamber 28. The end 150 of the piston is counterbored as at 152 in the illustrated embodiment to facilitate the medium flow involved as well as accommodate ring 136. It will thus be seen that as greater pressures are applied internally of the container 100, greater forces are applied to the container at its peripheral edge 142 due to the action of the pressures in chamber 28 tending to expand it, and these forces supplement the action of spring 16.

A significant advantage of the device 10 is that it may be applied to and removed from the container 100 without the multistep maneuvering formerly required of such devices. Thus, the device 10 may be inserted straight into the opening 98 and then released to bring the locking device 54 into operation, and when the device 10 is to be removed, after the chamber 28 has been contracted to the position indicated in FIGURES 1 and 2, the device 10 may be removed straight out of the opening 98. No sidewise tilting or cocking movement of the device 10 is necessary or is any other special maneuvering action required to retract the pawl 70.

I claim:
1. In a self-sealing test plug adapted to seal an aperture in a container during pressure testing of the container with the plug including a piston and cylinder assembly defining an expandable pressure chamber, resilient sealing means carried by said piston and adapted to engage the outer peripheral edge of the aperture to seal the aperture, a stem carried by the cylinder and extending through said piston for insertion within said aperture when said chamber is contracted, a locking device on the end of said stem adapted for cooperation with the inner periphery of said aperture after same has been inserted within the aperture and the chamber has expanded, and means for expanding and contracting said chamber, the improvement wherein:

said locking device comprises a pawl pivotally connected to said stem end for movement in a plane substantially paralleling the longitudinal axis of said stem, said pawl being of triangular configuration with two sides thereof of substantially equal length and being pivoted to said stem adjacent its mid portion and in substantial alignment with said axis of said stem for movement between an extended position wherein the other side thereof extends substantially transversely of said stem with said equal sides thereof disposed to face the piston for cooperation with the inner periphery of the aperture after said pawl has been inserted therethrough and said chamber expanded and a retracted position wherein said other side thereof extends substantially longitudinally of said stem to permit said pawl to be inserted through the aperture when said chamber has been contracted, and including means for biasing said pawl to said retracted position, and means for pivoting said pawl to said extended position when said pawl has been inserted through the aperture for cooperatoin with the inner periphery thereof.

2. The improvement set forth in claim 1 wherein:
said pivoting means comprises a bushing disposed about said stem and having one end thereof facing said pawl and proportioned to engage said pawl to move same from its retracted position to its retracted position to its extended position on expansion of said chamber.

3. The improvement set forth in claim 2 wherein:
said bushing is slidably mounted in said piston and slidably mounts said stem therein,
and including means for biasing said bushing in the direction of said pawl.

4. The improvement set forth in claim 3 wherein:
said bushing is slotted longitudinally thereof to provide communication between the interior of the container being tested and said chamber whereby pressures generated in the container are transmitted to said chamber for increasing the sealing action of said seal means during pressure testing of the container.

5. The improvement set forth in claim 4 wherein:
said one end of said bushing is continuous thereabout, and including a locking ring received about said bushing adjacent said end thereof.

6. In a self-sealing test plug adapted to seal an aperture in a container during pressure testing of the container, with the plug including a plunger mounted within a housing to define an expandable chamber, and with the housing provided with a stem extending through a bore in the plunger to project outwardly thereof, with the plunger carrying an annular seal adapted to engage the outer peripheral edge of the aperture to seal the aperture, said chamber being resiliently contractible to extend the stem from the plunger for insertion within the aperture, a locking device on the outwardly projecting end of the stem for cooperation with the inner periphery of said aperture after same has been inserted within the aperture and the chamber has expanded, and means for releasably locking said plunger relative to said housing to releasably hold said chamber contracted, the improvement wherein:
said locking device comprises a pawl pivotally connected to the stem end for pivotal movement in a plane substantially paralleling the longitudinal axis of said stem, said pawl being of triangular configuration with two sides thereof of substantially equal lengths and being pivoted to said stem adjacent its mid-portion and in substantial alignment with said axis of said stem for movement between an extended position wherein the other side thereof extends substantially transversely of said stem with said equal sides disposed to face the plunger for cooperation with the inner periphery of the aperture after said pawl has been inserted therethrough and said chamber expanded, and a retracted position wherein said other side thereof extends subtsantially longitudinally of said stem to permit said pawl to be inserted through the aperture when said chamber has been contracted, and including a bushing received between the stem and the plunger and having one end thereof projecting through said seal outwardly of said plunger toward but short of said pawl, said bushing one end being proportioned to engage said pawl to move same from its said retracted position to its said extended position, means for biasing said pawl to its retracted position, means acting on said bushing when said chamber is expanded to bias said pawl to said extended position in opposition to said biasing means for cooperation with the inner periphery of the aperture to lock the plug to the container, and stop means acting between said plunger and said bushing for limiting the movement of said bushing outwardly of said plunger under said acting means.

7. In a self-sealing test plug adapted to seal an aperture in a container during pressure testing of the container with the plug including a piston and cylinder assembly defining an expandable pressure chamber, resilient sealing means carried by said piston and adapted to engage the outer peripheral edges of the aperture to seal the aperture, a stem carried by the cylinder and extending through said piston for insertion within said aperture when said chamber is contracted, and a locking device on the end of said stem adapted for cooperation with the inner periphery of said aperture after same has been inserted within the aperture and the chamber has expanded, the improvement wherein:

said locking device comprises a pawl pivotally connected to said stem end for movement in a plane substantially paralleling the longitudinal axis of said stem, said pawl being of isosceles triangular configuration and being pivoted to said stem adjacent its mid-portion and in substantial alignment with said axis of said stem, said pawl being proportioned such that lengthwise of the unequal side thereof said pawl has a dimension exceeding the width of the aperture and transversely of said unequal side said pawl has a maximum dimension that is less than the width of said aperture, and including means for biasing said pawl to a retracted position wherein said pawl unequal side extends substantially longitudinally of said stem, and means for pivoting said pawl to an extended position wherein said unequal side thereof extends substantially transversely of said stem with the equal sides thereof facing said piston when said pawl has been inserted through the aperture for cooperation with the inner periphery thereof.

8. In a self-sealing test plug adapted to seal an aperture in a container during pressure testing of the container with the plug including a piston and cylinder assembly defining an expandable pressure chamber, resilient sealing means carried by said piston and adapted to engage the outer peripheral edges of the aperture to seal the aperture, a stem carried by the cylinder and extending through said piston for insertion within said aperture when said chamber is contracted, and a locking device on the end of said stem adapted for cooperation with the inner periphery of said aperture after same has been inserted within the aperture and the chamber has expanded, the improvement wherein:

said locking device comprises a single pawl pivotally connected to said stem end for movement in a plane substantially paralleling the longitudinal axis of said stem, said pawl being of isosceles triangular configuration and being pivoted to said stem adjacent its mid-portion and in substantial alignment with said axis of said stem for movement between a retracted position wherein the unequal side extends substantially longitudinally of said stem and an extended position wherein the unequal side extends substantially transversely of the stem with the equal sides thereof facing the piston for cooperation with the aperture inner periphery after the pawl has been inserted through the aperture, said pawl being proportioned such that lengthwise of the unequal side thereof said pawl has a dimension exceeding the width of the aperture and transversely of said unequal side said pawl has a maximum dimension that is less than the width of said aperture, and including means for biasing said pawl to said retracted position, and means for pivoting said pawl to said extended position when said pawl has been inserted through the aperture for cooperation with the inner periphery thereof.

References Cited

UNITED STATES PATENTS

| | | | |
|---|---|---|---|
| 2,581,536 | 1/1952 | Johns | 220—25 |
| 2,581,537 | 1/1952 | Maisch | 220—25 |

JAMES B. MARBERT, *Primary Examiner.*